(12) United States Patent
Ben-Yehuda et al.

(10) Patent No.: US 10,628,301 B1
(45) Date of Patent: Apr. 21, 2020

(54) SYSTEM AND METHOD FOR OPTIMIZING WRITE AMPLIFICATION OF NON-VOLATILE MEMORY STORAGE MEDIA

(71) Applicant: LIGHTBITS LABS LTD., Kfar Saba (IL)

(72) Inventors: Shmuel Ben-Yehuda, Haifa (IL); Ofir Efrati, Even Yehuda (IL); Abel Alkon Gordon, Haifa (IL); Sagi Grimberg, Kfar Saba (IL); Eran Kirzner, Moshav Elishama (IL); Maor Vanmak, Magal (IL)

(73) Assignee: Lightbits Labs Ltd., Kfar Saba (IL)

( * ) Notice: Subject to any disclaimer, the term of this patent is extended or adjusted under 35 U.S.C. 154(b) by 0 days.

(21) Appl. No.: 16/014,004

(22) Filed: Jun. 21, 2018

(51) Int. Cl.
*G06F 12/02* (2006.01)
*G06F 12/1009* (2016.01)
*G06F 3/06* (2006.01)

(52) U.S. Cl.
CPC .......... *G06F 12/0246* (2013.01); *G06F 3/064* (2013.01); *G06F 3/0616* (2013.01); *G06F 3/0679* (2013.01); *G06F 12/1009* (2013.01); *G06F 2212/657* (2013.01); *G06F 2212/7201* (2013.01); *G06F 2212/7202* (2013.01)

(58) Field of Classification Search
CPC ...... G06F 12/084; G06F 3/061; G06F 3/0631; G06F 3/0647; G06F 3/0683; G06F 12/046; G06F 12/1009; G06F 3/064; G06F 3/0616
USPC ........................................................ 711/103
See application file for complete search history.

(56) References Cited

U.S. PATENT DOCUMENTS

2014/0136575 A1* 5/2014 Zhao .................... G06F 16/215
707/813
2017/0054824 A1* 2/2017 Friedman .............. G06F 3/0619

* cited by examiner

*Primary Examiner* — Than Nguyen
(74) *Attorney, Agent, or Firm* — Pearl Cohen Zedek Latzer Baratz LLP

(57) ABSTRACT

A system and method of managing non-volatile computer storage media may include: receiving at least one value of at least one parameter, including for example: a size of data objects, a frequency of data write requests, a size of write units (WUs) and a required write amplification value; setting a cyclic write pointer to point to a WU having a logical address space; setting a cyclic garbage collection (GC) pointer to point to a WU having a logical address space, located ahead of the WU pointed by the write pointer; performing GC on the WU pointed by the GC pointer; and incrementing the cyclic GC pointer to point to a next WU according to the value of the cyclic write pointer and according to the at least one received parameter value.

18 Claims, 10 Drawing Sheets

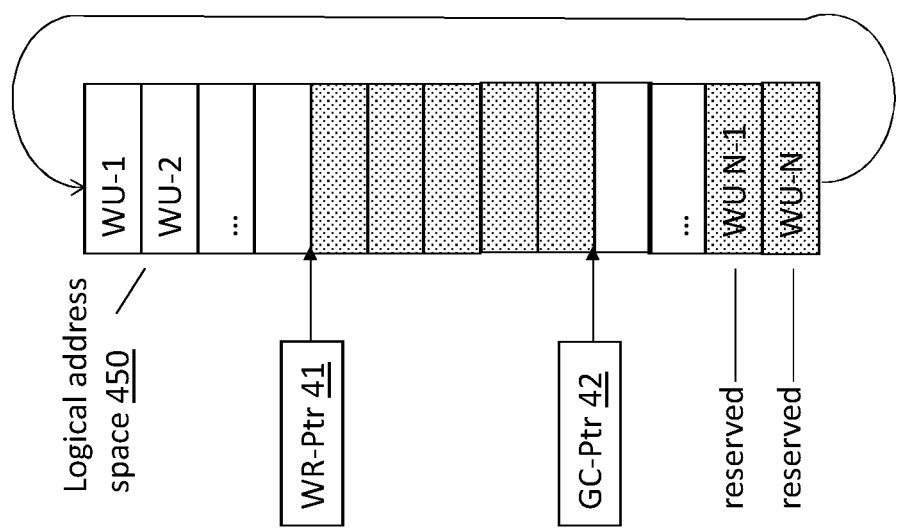

SYSTEM AND METHOD FOR OPTIMIZING WRITE AMPLIFICATION OF NON-VOLATILE MEMORY STORAGE MEDIA

FIELD OF THE INVENTION

The present invention relates generally to non-volatile storage systems. More specifically, the present invention relates to using address virtualization in non-volatile storage systems.

BACKGROUND OF THE INVENTION

Non-volatile memory (NVM) devices, such as flash memory devices and solid-state drives (SSDs) have become ubiquitous in a variety of computerized applications. The inherent speed of data fetching from NMV devices, as well as the lack of moving mechanical parts and relative small aspect ratio have made these devices a preferable selection to hard-disk storage systems, in applications ranging from Internet-of-Things (IoT) devices to cloud-based servers.

The internal storage of NVM devices is divided into blocks, also known as "erase blocks", which are further divided into equally-sized pages, so that each block is a collection of pages. Blocks are defined as the smallest units that can be erased, whereas pages are defined as the smallest units that can be written.

In order to reuse (e.g.: re-write) a page, all the pages belonging to the same block must be erased. Thus, flash devices always write new data into free pages, that have been previously erased, even if a previous version of the data has been written in a different page. When this happens, the page holding the old data becomes invalid, but cannot be re-used until the block holding it is erased in its entirety. The number of times a block can be erased is limited and affects the endurance of the flash device.

Flash devices have an internal garbage-collection (GC) mechanism, responsible for reclaiming invalid pages. The internal GC mechanism scans for candidate blocks to be reclaimed (e.g., blocks that have more invalid pages than valid pages). The valid pages of candidate blocks are read and copied to a new block. Finally, the GC mechanism erases the whole block and marks it as free, so it could be re-used for future writes.

When a host computer writes a data object to an NVM device, it may specify a desired location for the data using a virtual address in an application address space. The virtual address may, for example include a namespace, which can be thought of as a virtual hard drive, and a virtual user block address (UBA), which is an offset from the namespace within the application address space. The NVM device may store the data object in any physical address within the NVM and may also move the data location as a result of GC activity. The NVM implements a translation layer to maintain the association of each data object's application address with the physical address on the NVM device.

Write operations can be divided into two classes: writes generated by the internal GC mechanism and writes generated by the external host computer. The total number of concurrent writes a device can handle is limited, thus it is desirable to minimize the number of write operations generated by the internal GC process so that the flash device will be able to handle more external host write operations. Moreover, reducing the number of GC writes directly reduces the number of required erasure cycles (also known as program-erase (PE) cycles), thus improving the lifetime and endurance of the NVM device.

The write amplification (WA) parameter is a metric used to measure the relation between external write operations and GC write operations, and is defined in the following equation Eq. 1:

$$WA=(External\text{-}Writes+GC\text{-}Writes)/(External\text{-}Writes) \quad \text{Eq. 1}$$

It is desired to keep the WA as low as possible. For example: when WA is equal to 1 (optimal value), there are no GC write operations.

NVM devices use fixed-size user data blocks, and applications are forced to use this user data-block size to store data. Applications that require management of data that is not aligned with an integer product of the user data block size (e.g., file system, database, compressed block device, key/value storage) need to implement their own translation layer and GC mechanism. For example, a key/value application that writes objects of variable sizes, needs to know the virtual user block address (UBA) wherein each data object is stored. If data objects are not aligned to the virtual user data block size, the key/value application will need to reclaim invalid space.

The translation layer and GC mechanism of the application works in parallel to the translation layer and internal GC mechanism of the NVM device, resulting in a non-cooperative duplicated process that increases the WA of the overall system, reduces the performance and shortens the life-span of the NVM device.

A system and a method for combining the management of the GC mechanisms and translation layers, of both the NVM device and application, that would enable storage of variable-sized objects (e.g., compressed data blocks or key/value objects) to be stored in flash media while minimizing the overall WA of the system is therefore desired.

SUMMARY

Embodiments provide herein a method of managing non-volatile memory (NVM) computer storage media comprising at least one NVM storage device, by at least one processor. The method may include:
a. setting a write pointer to point to a write unit (WU) having a logical address space;
b. receiving at least one data object, having a user block address (UBA);
c. mapping the UBA to a logical block address (LBA) within the WU pointed by the write pointer;
d. repeating steps b and c until the address space of the WU is full;
e. storing the content of the WU in at least one physical block address (PBA) of the NVM storage media;
f. updating the write pointer to point to a next WU; and
g. repeating steps b thru f with the next WU.

Embodiments of the method may continue (e.g. perpetually) at least as long as data objects are received and are required to be stored in a physical address of the NVM storage media.

According to some embodiments, mapping the UBA to an LBA may include: updating the mapping between the UBA and the respective LBA in a translation table; and updating a status of validity of the LBA to one of 'valid' and 'invalid' in a metadata table.

In some embodiments, setting a write pointer to point to a WU having a logical address space may include:

allocating a logical address space comprising a plurality of logical blocks, wherein each logical block refers to a physical data block of the NVM storage media; and dividing the allocated logical address space into a plurality of WUs, wherein each WU has a fixed-sized portion of the allocated logical address space, and wherein each WU represents a fixed-sized portion of a plurality of data-pages on the NVM storage media.

In some embodiments, the write pointer may be a cyclic pointer, and updating the write pointer may include incrementing the write pointer value sequentially, to point to a next WU, from the first WU of the allocated logical address space to the last WU of the allocated logical address space and wrap around back to the first WU of the allocated logical address space.

Embodiments may further include:

setting a garbage collection (GC) pointer to point to a WU of the allocated logical address space that is located ahead of the WU pointed by the write pointer performing GC on the WU pointed by the GC pointer; and updating the GC pointer to point to a next WU.

In some embodiments, the GC pointer may be a cyclic pointer, and updating the GC pointer may include incrementing the GC pointer value sequentially, to point to a next WU, from the first WU of the allocated logical address space to the last WU of the allocated logical address space and wrap around back to the first WU of the allocated logical address space.

Performing garbage collection on the WU pointed by the cyclic GC pointer may include:

reading valid content of at least one page in the WU pointed by the GC pointer;

marking the at least one page in the WU pointed by the GC pointer as invalid;

writing the content into at least one page in the WU pointed by the write pointer; and marking the at least one page in the WU pointed by the write pointer as valid.

Embodiments may further include:

receiving at least one value of at least one parameter, wherein said parameter is selected from a list consisting of: size of data objects, frequency of data write requests, size of WUs and required write amplification (WA) value; and incrementing the cyclic GC pointer according to the value of the cyclic write pointer and according to the at least one received value.

Embodiments may further include:

analyzing the data in the metadata table, to obtain a parameter of occupancy for each WU;

marking WUs in which the occupancy is above a predefined occupancy threshold as occupied;

if the GC pointer points to a non-occupied WU, then performing GC and incrementing the GC pointer to the next WU;

if the GC pointer points to an occupied WU, then incrementing the GC pointer without performing GC on the occupied WU;

if the write pointer points to a non-occupied WU, then mapping UBA of received data objects to at least one LBA within the WU until the WU is full, and then incrementing the write pointer to the next WU; and if the write pointer points to an occupied WU, then incrementing the write pointer to the next WU, without mapping UBA of received data objects to the occupied WU.

Embodiments may further include:

receiving a percentage of WUs, that are to be kept for over-provisioning;

marking at least one WU as reserved for over-provisioning, according to the predefined percentage;

if the GC pointer points to a non-reserved WU, then performing GC and incrementing the GC pointer to the next WU;

if the GC pointer points to a reserved WU, then incrementing the GC pointer, to point to the next WU without performing GC on the reserved WU;

if the write pointer points to a non-reserved WU, then mapping UBA of received data objects to at least one LBA within the WU until the WU is full, and then incrementing the write pointer to the next WU; and if the write pointer points to a reserved WU, then incrementing the write pointer to point to the next WU without mapping UBA of received data objects to the occupied WU, to increase the over-provisioning of the NVM media.

Embodiments may further include:

receiving a required level of WA;

analyzing the data in the metadata table, to obtain a parameter of occupancy for each WU;

marking, by the processor, WUs in which the occupancy is above a predefined occupancy threshold as occupied;

determining the actual WA according to at least one of: the number of occupied WUs, the number of reserved WUs, and a distance between the write pointer and the GC pointer; and dynamically adjusting the percentage of WUs, that are to be reserved for over-provisioning, to adjust the over-provisioning of the NVM media, and to accommodate the required level of WA.

Embodiments may further provide a system for managing (NVM) computer storage media including at least one NVM storage device. Embodiments may include a non-transitory computer memory device upon which modules of computer instruction code are stored and a processor associated with the non-transitory computer memory device and configured to execute the modules of computer instruction code. The processor may be configured, upon execution of the computer instruction code, to:

a. set a write pointer to point to a write unit (WU) having a logical address space;

b. receive at least one data object, having a user block address (UBA);

c. map the UBA to a logical block address (LBA) within the write unit (WU) pointed by the write pointer;

d. repeat steps b and c until the address space of the WU is full;

e. store the content of the WU in at least one physical block address (PBA)

f. update the write pointer to point to a next WU; and g. repeat steps b thru f with the next WU.

Embodiments may further provide method of managing NVM computer storage media comprising at least one NVM storage device, by at least one processor, the method including:

causing a first pointer to reference a WU having a logical address space;

receiving a data object having a UBA, mapping the UBA to an LBA within the WU referenced by the pointer, and repeating the receiving and mapping operations until the address space of the WU is filled;

saving the data in the WU in at least one PBA of the NVM media;

updating the pointer to point to a next WU; and
performing the receiving and mapping repetition, and the saving operation for a subsequent WU.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 is a block diagram depicting WUs that may be included in a logical address space, and WUs that are declared as reserved, which may be part of a system for managing NVM storage media, according to some embodiments.

Figure 1:
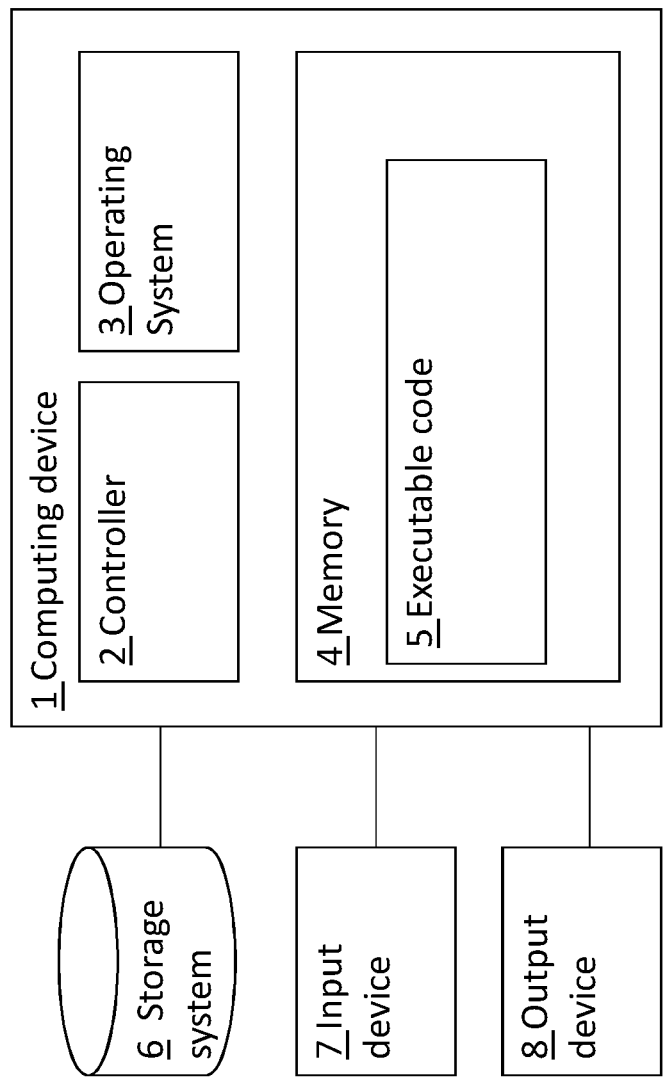
FIG. 1 is a block diagram depicting a computing device, which may be included within a system for managing non-volatile memory (NVM) computer storage media, according to some embodiments.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for providing a single point of control to NVM storage media that may include one or more NVM storage devices. Embodiments may be configured to optimize the write amplification (WA) metric and enhance the NVM storage devices' life-expectancy by cancelling non-cooperative address translations and garbage collection (GC) processes, that may be performed concurrently by applications running on host computers, and by at least one controller of the at least one NVM storage device.

An embodiment may be configured to write data objects onto the NVM media into complete data blocks, and in a sequential, cyclic pattern. When the same data objects are later re-written to the NVM media, complete data blocks become invalid, page after page, in that same order.

From the NVM controller's point-of-view, this write pattern may ensure that there would never be valid data objects that are "scattered" in the NVM's physical address space, and need to be copied elsewhere, nor would there be data blocks that need to be aggregated from a plurality of pages of other blocks within the NVM storage media's physical address space. This condition may effectively cancel the operation of the internal NVM controller's GC process, reducing it to merely erasing completely-invalidated blocks, to enable future write access thereto.

Reference is now made to FIG. 1, which is a block diagram depicting a computing device, which may be included within an embodiment of a system for managing NVM computer storage, according to some embodiments.

Computing device 1 may include a controller 2 that may be, for example, a central processing unit processor (CPU), a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 100 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short-term memory unit, a long-term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM.

Executable code 5 may be any executable code, e.g., an application, a program, a process, task or script. Executable code 5 may be executed by controller 2 possibly under control of operating system 3. For example, executable code 5 may be an application that enforces security in a vehicle as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory1 20 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

The term "NVM device" is used herein to refer to a single device, such as a flash storage device and a solid-state storage device (SSD) or the like, that may, or may not be managed by an NVM controller. The term "NVM media" 30 is used herein to refer to one or more NVM devices, that may be managed by a single NVM controller 310 or not managed by an NVM controller 310 or managed by a plurality of NVM controllers 310.

Figure 2:
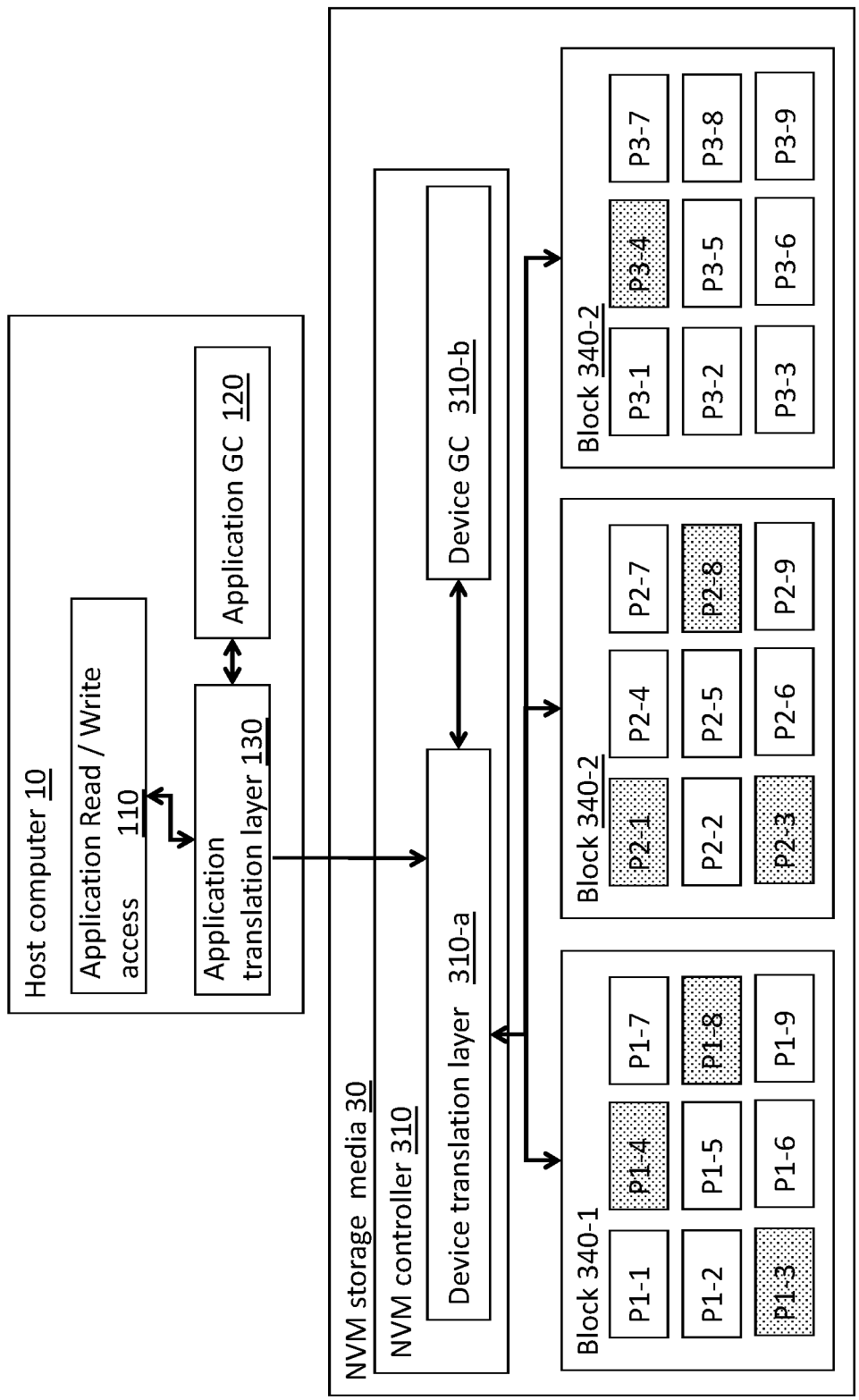
FIG. 2 is a simplified block diagram, depicting a host computer's write operation, in absence of a system for managing NVM storage media.

Reference is now made to FIG. 2, which depicts a simplified block diagram, depicting a host computer's write operation, in the absence of the system for managing and optimizing write amplification (WA) of NVM storage media.

According to some embodiments, host computer 10 may be implemented as a computational device (e.g. element 1 of FIG. 1) and may be running or executing an application 110 that may require storing a data object on NVM storage media 30. Application 110 may be required to work in a virtual application address space, including a plurality of fixed-sized user data blocks.

If the data object is not aligned to the size of the user data blocks, an application translation layer 130 will be required to translate the data object's address to a specific user block address (UBA), and an application-level GC mechanism 120 will be required to retrieve invalid user blocks.

The UBA address may be propagated to NVM storage media 30, to a controller 310, where it may be translated again in an inherent device translation layer 310-*a*, to obtain an addressable, physical location on the NVM media (e.g. page1-4 on data block 340-1).

NVM controller also employs its own, inherent GC module 310-*b*, which may be oblivious to application GC 120, hence causing duplication of GC write operations on an NVM storage device of NVM storage media 30.

Figure 3A:
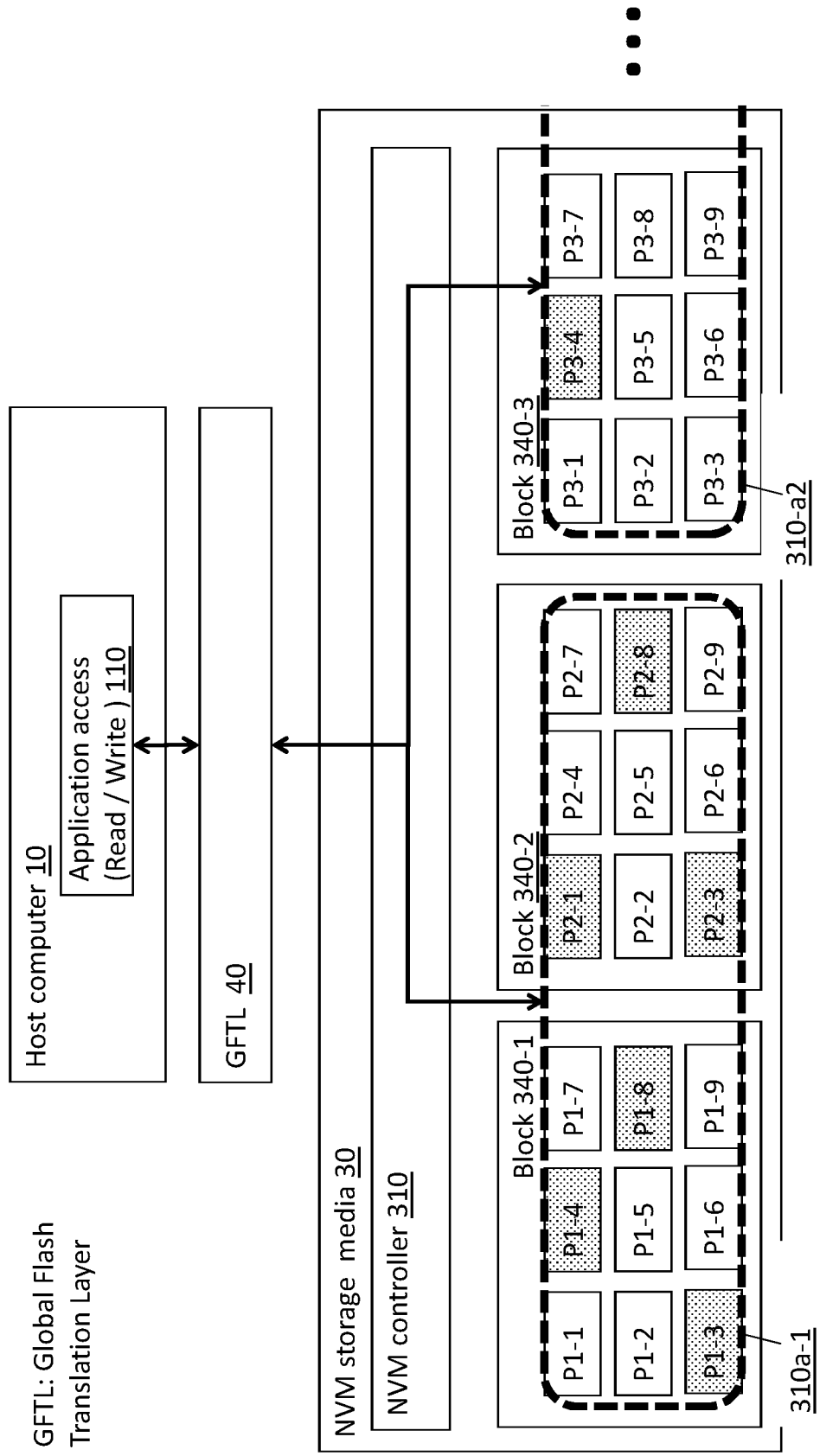
FIG. 3A is a block diagram depicting a system for optimizing WA of NVM storage media, according to some embodiments.
Figure 3B:
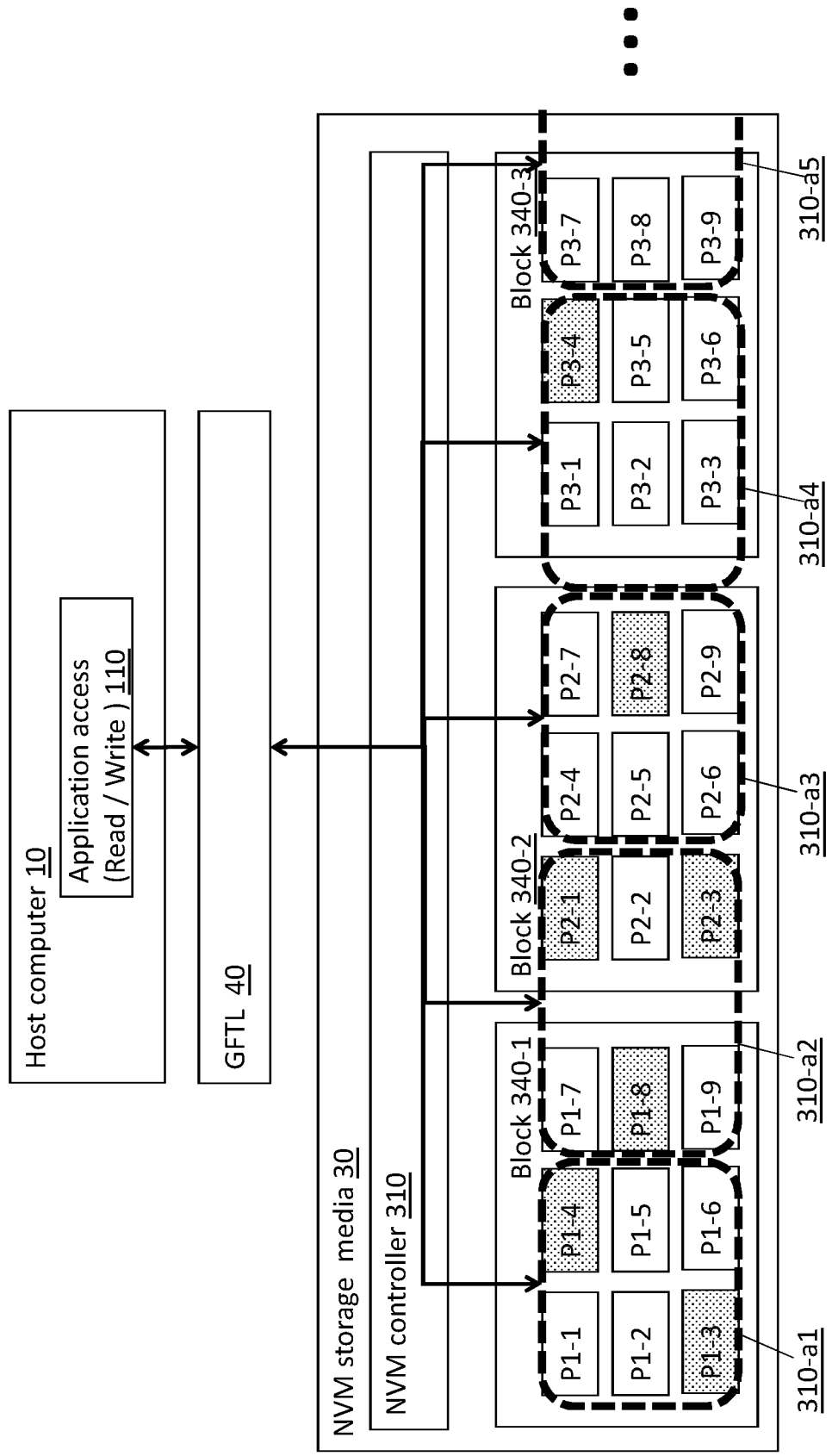
FIG. 3B is a block diagram depicting a system for optimizing WA of NVM storage media, according to some embodiments.

Reference is now made to FIG. 3A and FIG. 3B, which are block diagrams depicting an example of an embodiment for managing storage and optimizing WA on one or more NVM storage media 30, according to some embodiments.

Embodiments may manage data storage on NVM media including one or more NVM devices 30 by (a) controlling a mapping of data objects having virtual UBA addresses from an application address space to logical LBA addresses on a logical address space, and (b) sending the data objects referred by the LBA addresses to the one or more NVM storage device for storage, as explained herein.

Embodiments may include a global flash translation layer (GFTL) 40, which may be implemented as a computational device (e.g. element 1 of FIG. 1). GFTL 40 may be communicatively connected to host computer 10 and associated with at least one NVM storage device 30. For example, GFTL 40 may be connected to host computer 10 via a computer network (e.g. Internet) and attached to NVM 30 through a Peripheral Component Interconnect Express (PCIE) bus.

In another example, GFTL 40 may be connected to a plurality of NVM devices through a port switch, configured to route data between an embodiment of the system and at least one port of at least one NVM device of the plurality of NVM devices GFTL 40 may include a logical address space, including a plurality of logical blocks, which may refer to physical data blocks of the NVM storage media (e.g. 340-1, 340-2, 340-3), as explained in relation to FIG. 4, below.

The logical address space may be divided into a plurality of write units (WUs), as explained further below. Each WU may represent a fixed-sized portion of contiguous pages of the NVM storage media (e.g.: 310-a1, 310-a2).

In some embodiments, at least one WU may represent a portion of the NVM media (e.g.: 310-a1) that may span across one or more NVM device.

GFTL 40 may be configured to provide a single point of control for managing the address translation and GC processes between application 110, running on host computer 10, and the NVM storage media 30, as explained further below.

GFTL 40 may cause a first pointer to reference a WU, having a logical address space. GFTL may then receive a data object having a UBA and map the UBA to an LBA within the WU referenced by the pointer. This operation of receiving data objects and mapping of the UBA address to an LBA address may be repeated until the address space of the WU is filled, e.g. until there is no more space in the WU for an additional received data object.

GFTL 40 may save the data content of the filled WU in at least one PBA of the NVM media, and may continue the operation of receiving data objects, mapping them and storing them as long as at least one application 110 on host computer 10 requires access to NVM storage media 30.

As shown in FIG. 3A, each WU may represent a plurality of physical data blocks of NVM media 30, that may span over one or more NVM device. For example, data blocks 340-1 and 340-2 may reside on the same NVM storage device and a first WU may represent a combined address space 310a-1 of physical data blocks 340-1 and 340-2.

According to some embodiments, NVM storage media 30 may include a plurality of NVM storage devices (e.g., multiple flash devices), and at least one WU may be configured to represent an address space that spans over one or more NVM storage devices. For example, data blocks 340-1 and 340-2 may reside on separate NVM storage devices and the first WU may represent a combined address space 310a-1 of physical data blocks 340-1 and 340-2 of the separate NVM devices.

Alternately, as shown in FIG. 3B, each WU may represent a contiguous address space, including a plurality of data pages from one or more physical data blocks. For example, a second WU may represent the combined address space of pages P1-7, P1-8 and P1-9 of physical data block 340-1 and pages P2-1, P2-2 and P2-3 of physical data block 340-2.

In some embodiments, all WUs of the logical address space are allocated the same size. This size may be determined according to a variety of parameters, including for example: data storage rate, size of data objects, frequency of data access, the number of NVM devices included in NVM media 30, required WA, etc. The parameters may be stored on a memory device (e.g. element 4 of FIG. 1, element 411 of FIG. 4) or on a header of NVM media 30.

Figure 4:
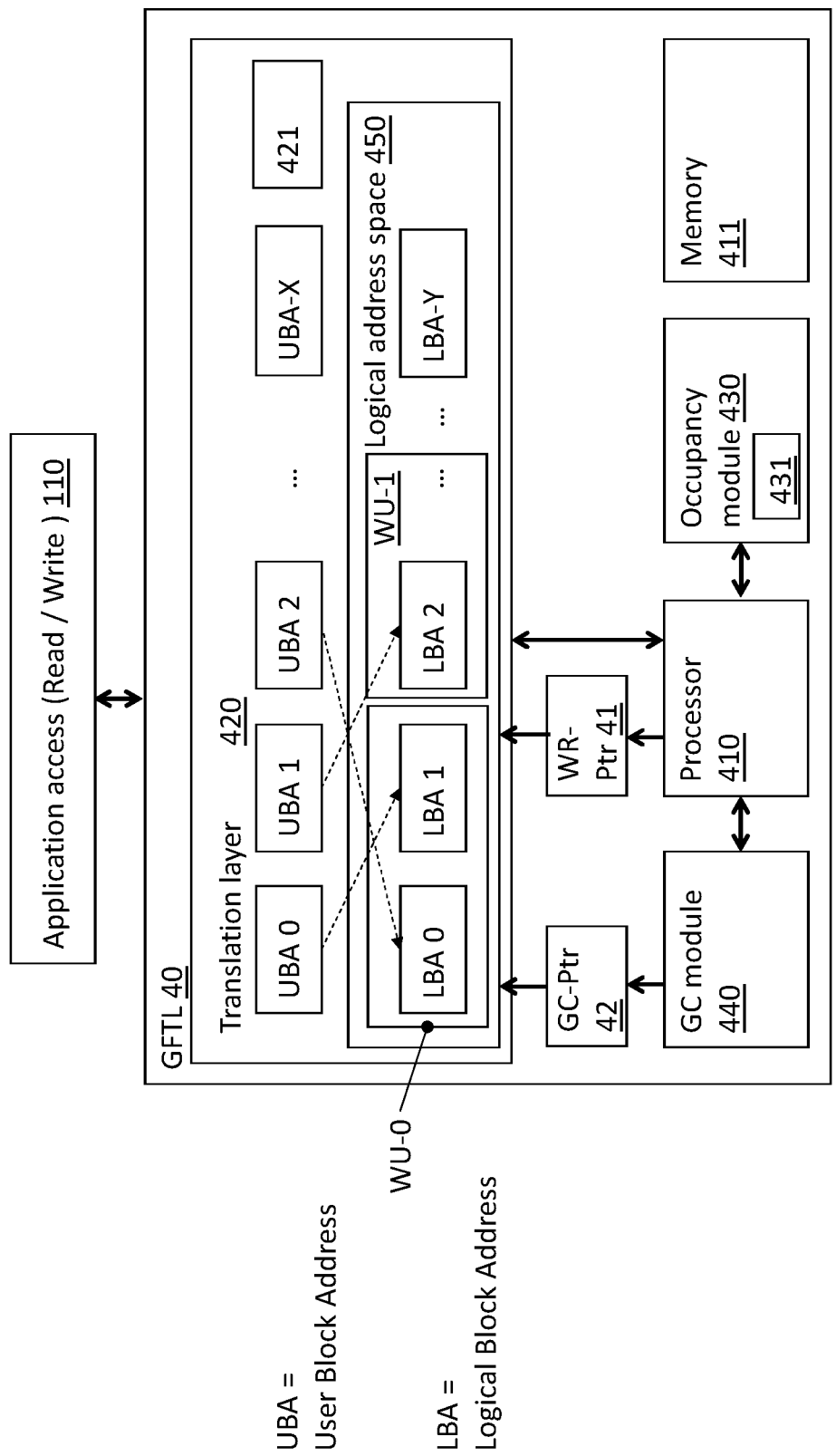
FIG. 4 is a block diagram depicting the content of the Global Flash Translation Layer (GFTL), which is part of a system for managing NVM storage media, according to some embodiments.

Reference is now made to FIG. 4 is, which is a block diagram depicting the example content of the Global Flash Translation Layer 40 (GFTL), which may be part of the system for optimizing WA of NVM storage media, according to some embodiments. GFTL 40 may include a non-transitory computer memory device 411 in which modules of computer instruction code are stored, and a processor 410 associated with the non-transitory computer memory device 411 and configured to execute the modules of computer instruction code, to implement embodiments of the present invention.

Processor 410 may be configured to allocate a logical address space 450, comprising a plurality of logical blocks (LBA0 thru LBA-Y), wherein each logical block refers to a physical data block of the NVM storage media, as explained below in relation to FIG. 5A and FIG. 5B. The term 'allocation' is used herein to refer to a process by which memory space (e.g. of element 4 of FIG. 1) is dedicated or reserved, e.g. by processor 410, to the purpose of mapping at least one data object referred by a UBA to an LBA.

Processor 410 may divide the allocated logical address space into a plurality of WUs (e.g. WU-0), wherein each WU has a fixed-sized portion of the allocated logical address space, as explained below in reference to FIG. 5A and FIG. 5B. Each WU of the plurality of WUs may represent a fixed-sized portion of a plurality of data-pages on the NVM storage media, as also explained below in reference to FIG. 5A and FIG. 5B.

Processor 410 may be configured to define a cyclic write pointer 41 and set it to point or refer to a WU of the logical address space. Processor 410 may be further configured to define a cyclic GC pointer 42 and set it to point or refer to another WU of the logical address space, different from the WU pointed by write pointer 41.

Write pointer 41 and GC pointer 42 may be cyclic, in the sense that processor 410 may be configured to increment the value of these pointers in a sequential, cyclic pattern, from the first WU of the allocated logical address space 450 to the last WU of the allocated logical address space 450 and, after the last WU, on incrementing, wrap around back to the first WU of the logic address space (e.g., repeat the values of the WU address space).

Processor 410 may locate the GC pointer ahead of the write pointer, to perform garbage collection on the WU pointed by the GC pointer, and thus prepare WUs for write pointer 41, as explained herein. The term 'ahead' in this context relates to the GC pointer referring to a WU that has an address value that is higher than the address value of the write pointer, or a WU that precedes the WU in the order of pointer incrementation, as elaborated below in relation to FIGS. 6a, 6B and 6C.

For example, write pointer 41 may point to a first address (e.g. 0x10) in logical address space 450, and GC pointer 42 may point to a second address (e.g. 0x20) in logical address space 450. The pointers may be incremented (e.g. 0x11 and 0x21 respectively), keeping GC pointer 42 ahead of write pointer 41 in the direction of pointer incrementation. When the pointers reach the end of the logical address space 450 (e.g. 0xFF), they may be incremented cyclically, back to the beginning of logical address space 450 (e.g. 0x00), keeping GC pointer 42 ahead of write pointer 41 in the direction of pointer incrementation.

According to some embodiments, GFTL 40 may include a translation layer 420, for mapping (e.g., translating) user block addresses (UBAs) to logic block addresses (LBAs) within the logical address space 450. For example, translation layer 420 may take as input a UBA (e.g. an address of a data object received from application 110) and produce as output an LBA. Embodiments of translation layer 420 may be implemented as a translation table 421, associating UBAs with respective LBAs, as shown in the example of FIG. 4 by dashed arrows.

Processor 410 may receive at least one data object having a UBA in the virtual, application address space, to be stored on the NVM storage media. Processor 410 may map or translate the UBA of the data object to an LBA of a logical block within the WU pointed by the cyclic write pointer. For example, as shown in FIG. 4 data stored on UBA 0 may be mapped to LBA 1. Processor 410 may be configured to continuously or repeatedly update the mapping or correspondence between the virtual address of received data objects (e.g. UBA-0, UBA-1, etc.) in the application address space, and their respective addresses in the logical address space (e.g. LBA-0, LBA-1, etc.) in translation layer 420.

According to some embodiments, GFTL 40 may continue to map or translate at least one UBA of a data object to an LBA of a logical block, as long as data objects are received from host 10, or at least as long as data objects need to be garbage-collected. This may be seen as analogous to a perpetual operation of an operating system, that is executed as long as the computing device it resides on is active.

For example, GFTL 40 may receive a UBA address which includes a combination of a namespace address (e.g. an address of a virtual hard drive) and an offset from the namespace address, as known to persons skilled in the art. GFTL 40 may map the UBA address to an LBA address that includes the address of the WU pointed by the write pointer and an offset to a logical data block within that WU. GFTL 40 may pass or send the data object mapped to the LBA address to an NVM storage media (e.g. element 30 of FIG. 2) for storage.

Following the mapping or translation of received data blocks to LBAs, NVM storage media 30 may store the received data objects into physical data blocks of the NVM storage media, having physical block addresses (PBAs). In some embodiments, storage of the data block on NVM storage media may be managed by an NVM media controller (e.g. element 310 of FIG. 2), as known to persons skilled in the art of computer storage.

It is important to note that although GFTL 40 may not directly control the location (e.g. the PBA) of stored data objects on NVM media 30 (that may be controlled by an inherent NVM media controller 310), the order at which data objects are mapped to LBAs of the logical address space may directly affect linearity of data storage on NVM media 30, and the consequent write amplification (WA) of NVM media 30 during its operation, as explained herein.

Data objects may continuously be received (e.g. from application 110 of FIG. 3A) by processor 410. The data objects may be mapped to LBAs and appended or added to the WU pointed by the write pointer, until the address space of the WU pointed by the cyclic write pointer is full.

For example, each WU may include a continuous range of LBAs, e.g.: WU 0 may include LBA 0 to LBA 7, WU 1 may include LBA 8 to LBA 15, etc. A first UBA (e.g. UBA X) may be mapped into a first LBA (e.g. LBA 'Y') within a first WU (e.g. WU 7'). This mapping may include writing the content of the first UBA into the address space of the first LBA, and updating translation table 421 of translation layer 420, to translate between the address of the first UBA (e.g. UBA X) and the address of the first LBA (e.g. LBA 'Y'). The mapping of UBAs to LBAs in the first WU (e.g. WU 7') may continue until the first WU is full, e.g. when there is no room in the WU to include an additional data object by mapping an additional UBA to an LBA therein.

Processor 410 may write the content of the first WU (e.g. WU 7') to an address space of physical data blocks (e.g. element 310-a1 of FIG. 3A) represented by the first WU, that may include one or more physical address blocks, as explained above in relation to FIGS. 3A and 3B.

Processor 410 may update write pointer 41, to point to a next WU (e.g. WU 'Z+1') of the logical address space 450, e.g. the immediately subsequent WU within the logical address space 450, and repeat the process of receiving data objects, mapping them to LBAs and storing them on NVM 30 with the next WU.

For example, processor 410 may increment the value of the write pointer in a sequential, cyclic order, to refer to an adjacent WU of the logical address space 450.

According to some embodiments, GFTL 40 may include a GC module 440, associated with processor 410, and implemented as a hardware module, a software module or any combination thereof. For example, GC module 440 may be implemented as a software process and may be executed by processor 410. In another example, GC module 440 may be implemented as a computational device (e.g. element 1 of FIG. 1) and may be communicatively connected to processor 410.

GC module 440 may be configured to receive GC commands from processor 410. GC module may perform garbage collection on a WU pointed by the GC pointer 42 and may modify the value of the GC pointer to point to a specific WU of the logic address space 450 according to the received commands For example, processor 410 may command GC module to: set the GC pointer 42 value to point to a WU of the allocated logical address space that is ahead of the WU pointed by the write pointer; perform GC on the WU pointed by the GC pointer; and update the GC pointer value to point to a next or immediately subsequent WU (e.g. in a sequential, cyclic order, as explained above).

According to some embodiments, GFTL 40 may include an occupancy module 430, associated with processor 410, and implemented as a hardware module, a software module or any combination thereof. For example, occupancy module 430 may be implemented as a software process and may be executed by processor 410. In another example, occupancy module 430 may be implemented as a computational device (e.g. element 1 of FIG. 1) and may be communicatively connected to processor 410.

Occupancy module 430 may be configured to continuously monitor mapping of data objects to LBAs, and garbage collection from LBAs within, and maintain at least one of: an updated status of validity of each data page within each LBA; and an updated status of occupancy for each WU. Embodiments of occupancy module 430 may be associated with processor 410 and may perform these actions according to commands received from processor 410.

For example, during a GC process, valid data pages may be moved from a first LBA (e.g. LBA-1), pointed by GC pointer 42 to a second LBA (e.g.: LBA-2), pointed by write pointer 41. Occupancy module 430 may consequently: (a) mark read pages within LBA-1 as invalid; (b) mark written pages within LBA-2 as valid; (c) calculate the occupancy of the WUs pointed by write pointer 41 and GC pointer 42 as the percentage of valid pages from the total number of addressable pages within the respective WUs; and (d) maintain an updated level of occupancy per each WU in a metadata table 431.

According to some embodiments, metadata table 431 may be implemented in the same table as translation table 421. In alternate embodiments, metadata table 431 and translation table 421 may be implemented as separate instances.

Processor 410 may be configured to perform garbage collection on the WU pointed to by the cyclic GC pointer, to "clear the way" and prepare WUs for the write pointer and increment the cyclic GC pointer according to the value of the cyclic write pointer.

According to some embodiments, the process of GC performed by GC module 440 may include at least one of: (a) reading content of at least one valid data page in the WU pointed by the GC pointer; (b) marking the at least one page in the WU pointed by the GC pointer as invalid; (c) writing the content into at least one page in the WU pointed by the write pointer; and (d) marking the at least one page in the WU pointed by the write pointer as valid.

The GC process described may prevent the NVM storage media controller 310 from performing GC on physical data blocks that are associated with the WU pointed by the cyclic GC pointer, because it may retrieve all valid data pages from the WU pointed by the GC and aggregate them in the WU pointed by the cyclic write pointer, and therefore may render an inherent GC of the NVM controller 310 redundant.

Figure 5A:
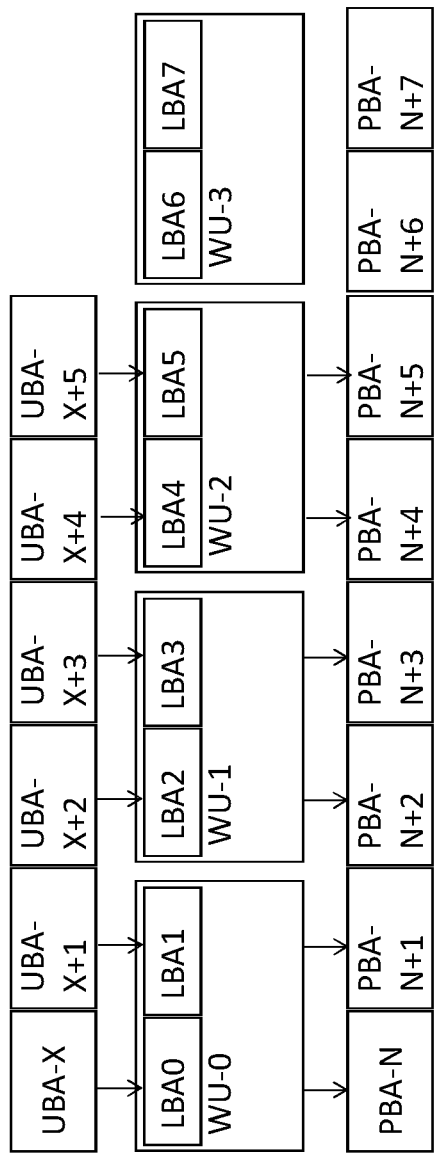
FIGS. 5A and 5B are schematic diagrams, depicting example of the operation of the GFTL garbage collection module, which may be part of the system for managing NVM storage media, according to some embodiments.
Figure 5B:
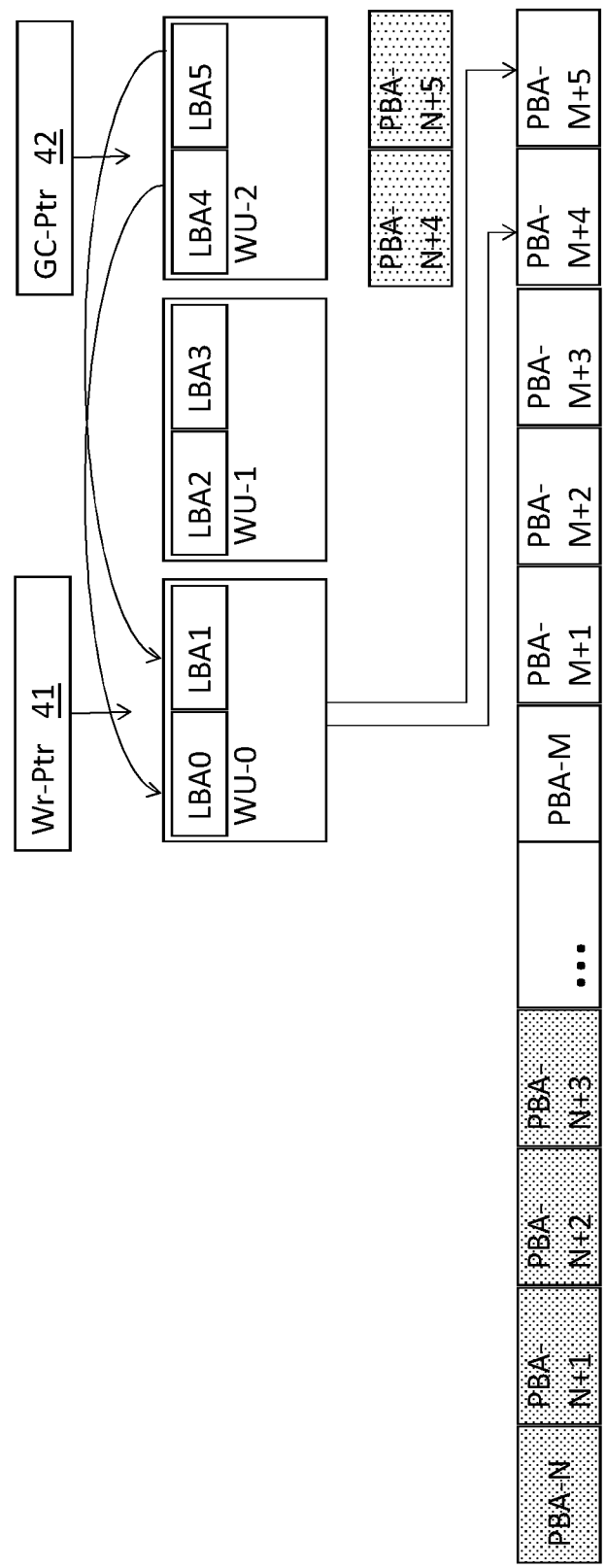

Reference is now made to FIGS. 5A and 5B, which are schematic diagrams, depicting an example of the operation of GFTL 40 and GC module 440, which may be part of the system for optimizing WA of NVM storage media, according to some embodiments.

FIG. 5A shows an exemplary condition of an embodiment, prior to applying GC by GC-module 400. A processor (e.g. element 410 of FIG. 4) may have received a plurality of data objects, pertaining to UBA X thru UBA X+5, and may have mapped them sequentially to LBA 0 thru LBA 5, that are included within WUs WU-0 thru WU-2 respectively. WU-0 thru WU-2 may have been filled to a point that additional data objects may not have been mapped thereto and may consequently be referred to as 'full' WUs.

It is important to note that as the mapping of data objects to LBAs may have been done sequentially, according to the location of the cyclic write pointer (e.g. element 41 of FIG. 4) as explained above, NVM controller (e.g. element 310 of FIG. 2) may have consequently stored the received data objects sequentially, to physical data blocks PBA-N thru PBA N+S.

FIG. 5B shows an exemplary condition of an embodiment during application of GC by GC module 440. As shown in FIG. 5B, GC pointer 42 may have gone through WU-0 and WU-1 and may now be pointing to WU-2. Write pointer 41 may have gone through previous WUs (not shown) and may now be pointing to WU-0. According to some embodiments, GC pointer may always point to a WU that is advanced in relation to the write pointer, in the direction of the WU's direction of incrementation, to prepare WUs to be written by the write pointer.

As shown in FIG. 5B, data objects that may have previously been mapped to full WU-0 and WU-1 may have been mapped elsewhere (not shown), and respective data objects that have resided in physical data blocks PBA-N thru PBA N+3 may have already been collected therefrom and written sequentially to PBA-M thru PBA M+3. During this process, NVM controller may only have needed to write the content of full WUs WU-0 and WU-1 to physical data blocks PBA-M thru PBA M+3 and may not have needed to check the validity of data pages PBA-N thru PBA N+3 or perform GC thereupon, thus rendering an inherent GC process as redundant. NVM controller 310 may now only erase PBA-N thru PBA N+3, and thus prepare them for writing.

According to some embodiments, the sequential order of written data objects on physical data blocks (e.g.: movement from sequential locations PBA-N thru PBA N+3 to PBA-M thru PBA M+3) may be maintained by the NVM controller, because physical data blocks are invalidated and erased by GC module 440 in the same sequential order in which they have been written by GFTL 40. As a result, the linearity of stored sequential data that may have been received from a host computer (e.g. element 10 of FIG. 2) by processor 410 may be maintained throughout data deletion and modification and may not be corrupted by an inherent GC process.

As further shown in FIG. 5B, data objects that may have been mapped to LBA4 and LBA5, within WU-2, which may be pointed by GC pointer 42, may be remapped to freed WU-0, which may be pointed by write pointer 41. Physical data blocks PBA N+4 and PBA N+5 may be about to be invalidated, and NVM controller 310 may be about to write the new content of now re-filled WU-0 in sequential order to physical data blocks PBA M+4 and PBA M+5.

As discussed above, in relation to FIG. 4, processor 410 may be configured to control occupancy module 430, to analyze data relating to the validity of pages, as stored in metadata table 431, and obtain a parameter of occupancy for each WU.

Processor 410 may receive (e.g. via a user interface, from the non-transitory memory device and the like) at least one parameter and may increment the cyclic GC pointer according to at least one of: the value of the cyclic write pointer, the at least one parameter and the occupancy of at least one WU.

For example: processor 410 may receive an occupancy threshold parameter (e.g. 90%) and determine whether at least one WU is occupied beyond the occupancy threshold parameter (e.g. the number of valid pages within the WU exceeds 90% of the total number of pages in that WU). Processor 410 may consequently mark the at least one WU in which the occupancy is above a predefined occupancy threshold as 'occupied' in metadata table 431.

Processor 410 may control the GC pointer (e.g. element 42 of FIG. 4), write pointer (e.g. element 41 of FIG. 4) and GC module 440 according to the marked occupancy so:

if GC pointer 42 points to a non-occupied WU, then command GC module 440 to perform GC and increment GC pointer 42 to the next WU (e.g. the immediately subsequent WU within the logical address space 450);

if GC pointer 42 points to an occupied WU, then command GC module 440 to increment GC pointer 42 without performing GC on the occupied WU;

if write pointer 41 points to a non-occupied WU, then map UBA of received data objects to at least one LBA within the WU until the WU is full, and then increment the write pointer to the next WU; and if the write pointer 41 points to an occupied WU, then increment write pointer 41 to the next WU, without mapping UBA of received data objects to the occupied WU.

Experimental results show that skipping occupied WUs may enable GFTL 40 to improve the WA in the presence of 'cold' valid data (e.g. data that remains valid from one write cycle to another in the same physical location and is not copied to another physical location). However, skipping occupied WUs by GFTL 40 may cause some inherent GC activity within the NVM controller (e.g. element 310 of FIG. 2), because it breaks the sequential, cyclic write order. Experiments show that a 'global' write amplification metric may be regarded as a product of WA caused by GFTL 40 and inherent WA, caused by NVM controller 310, as shown in the following equation Eq. 2:

$$\text{Global-WA} = \text{WA-GFTL} \times \text{WA-NVM} \qquad \text{Eq. 2}$$

From GFTL's 40 perspective, WUs that have been skipped may not require GFTL GC read and write operations. This means that some of the write amplification (WA) has been moved from GFTL 40 to NVM controller 310. Even though the entity performing GC read and write operations has changed due to the sequential write order, GC read and write operations have not been duplicated, and hence the global WA has not increased due to skipping occupied WUs. Moreover, according to some embodiments, if the same WUs are skipped from one write-cycle to another, NVM controller 310 may be configured to identify the data as 'cold' and avoid performing GC operations on the respective physical data blocks altogether, thus decreasing the global WA despite skipping occupied WUs.

Figure 6C:
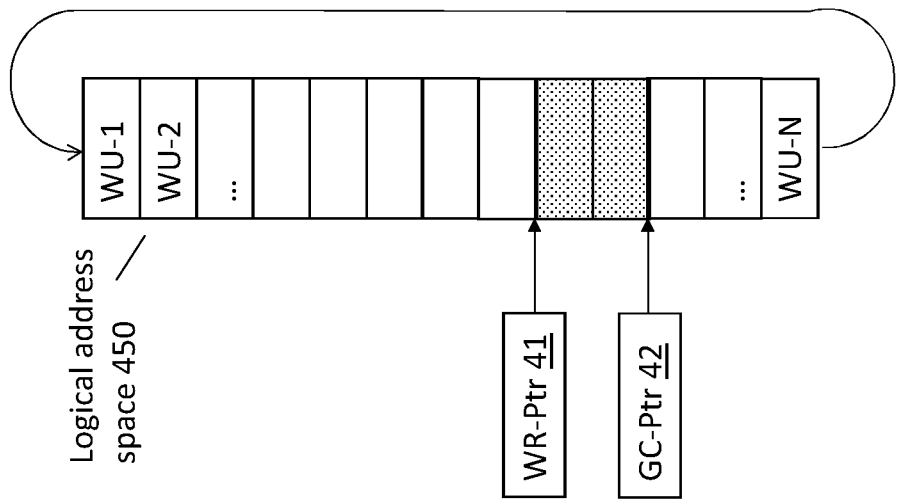
FIG. 6A, 6B, 6C are block diagrams depicting WUs that may be included in the logical address space, and different locations of the write pointer and garbage-collection (GC) pointer, which may be part of a system for managing NVM storage media, according to some embodiments.
Figure 6B:
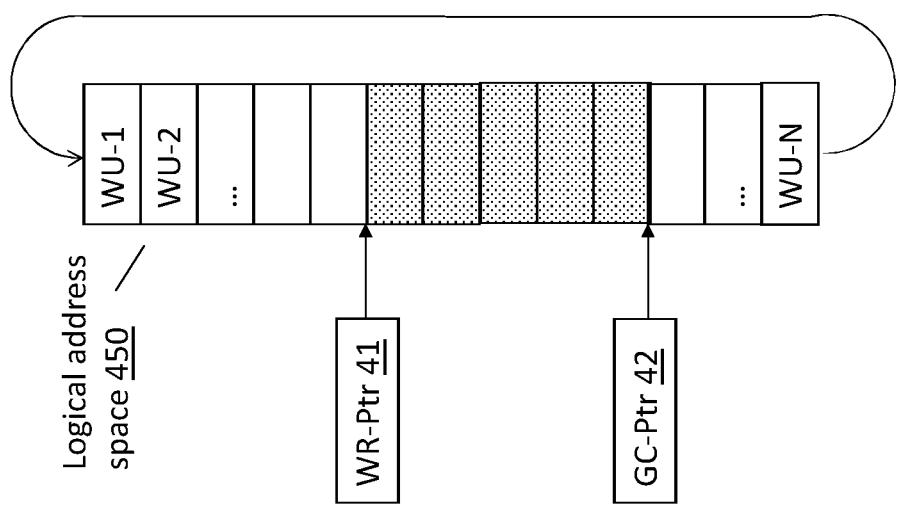
Figure 6A:
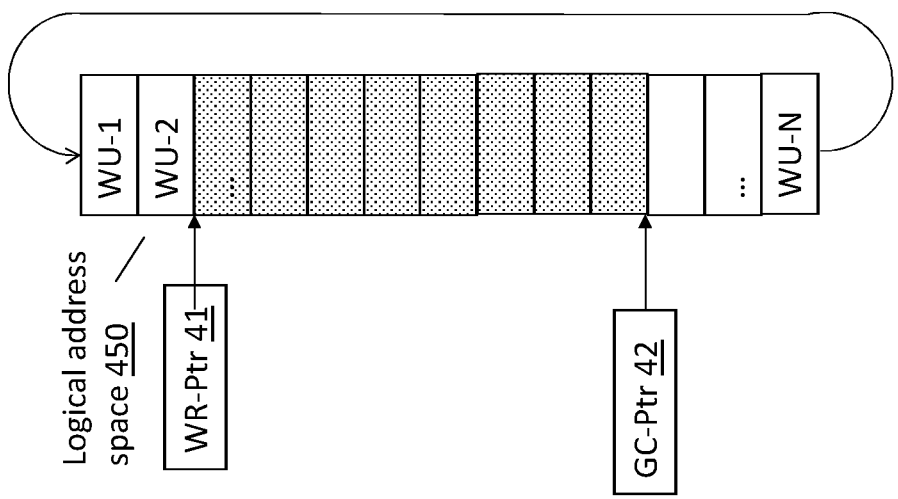

Reference is now made to FIGS. 6A, 6B, and 6C which are block diagrams depicting the WUs included in logical address space 450, and different examples of locations of write pointer 41 and GC pointer 42, according to some embodiments. As shown in FIG. 6A, FIG. 6B and FIG. 6C, GC pointer 42 and write pointer 41 are configured to be incremented sequentially, in a cyclic pattern. Valid data may be copied from a WU pointed by GC pointer 42, to a WU pointed by write pointer 41. The only difference between FIG. 6A, FIG. 6B and FIG. 6C is in the distance between GC pointer 42 and write pointer 41. The term 'distance' as used herein may mean the number of WUs in the gap between GC pointer 42 and write pointer 41.

FIG. 6A depicts a large distance between GC pointer 42 and write pointer 41. This distance may enable a host computer (e.g. element 10 of FIG. 2) to perform multiple write operations to the NVM storage media (e.g.: element 30 of FIG. 2), without need to perform garbage collection.

FIG. 6C depicts a small distance between GC pointer 42 and write pointer 41. This distance may not enable host computer 10 to perform a large number of write operations to NVM storage media 30 without first performing garbage collection on physical data blocks.

FIG. 6B depicts an intermediate distance between GC pointer 42 and write pointer 41. This distance may enable host computer 10 to perform an intermediate number of write operations to the NVM storage media 30, without a need to perform garbage collection.

According to some embodiments, a processor (e.g. element 410 of FIG. 4) may be configured to receive at least one parameter (e.g. from a user interface, from the non-transitory memory device and the like) and increment the cyclic GC pointer according to at least one of: the value of the cyclic write pointer and the at least one parameter. According to some embodiments, the at least one parameter may be one of a list including: the size of data objects, frequency of data write requests (e.g. by host computer 10), the size of WUs, and a required write amplification (WA) value.

For example, processor 410 may choose to increase a frequency of GC (and consequent incrementation of the value of GC pointer 42) when: (a) the size of data objects is large; (b) the frequency of data write requests is high; (c) the size of WUs is small, and/or (d) the required write amplification is high (e.g. above a predefined threshold). In a complementary manner, processor 410 may choose to decrease the frequency of GC (and consequent incrementation of the value of GC pointer 42) when: (a) the size of data objects is small; (b) the frequency of data write requests is low; (c) the size of WUs is large; and/or (d) the required write amplification is low (e.g. above a predefined threshold).

According to experimental results, the distance between the cyclic GC pointer and the cyclic write pointer affects the ratio between user write operations and GC write operations. A small distance tends to increase the portion of GC write operations from the total number NVM write operations and increase the write amplification (WA). In a complementary manner, a large distance tends to decrease the portion of GC write operations from the total number NVM write operations and decrease the WA.

As explained above, each WU (WU) may represent a contiguous address space, including a plurality of data pages from one or more physical data blocks. According to experimental results, performing a GC operation using large WUs (e.g. WUs that include a large number of data pages) may require less GC write operations, in relation to GC operations using small WUs. As a result, when small WUs are used (e.g. to reduce the interference of write operations on user read operations), a large distance between the cyclic GC pointer and the cyclic write pointer may be preferable. In a complementary manner, when large WUs are used, the GC process may require a small number of write operations, and a small distance between the cyclic GC pointer and the cyclic write pointer may be defined.

As known to persons skilled in the art of computer storage, NVM devices require auxiliary physical storage space, commonly referred to as "over-provisioning" to function properly. The additional over-provisioning storage space directly affects the WA. As an approximation, WA may be assessed according to the following equation Eq. 3:

$$WA=[(1/RESERVE\_SPACE\_RATIO)+RESERVE\_SPACE\_RATIO]/2 \qquad Eq. 3$$

where RESERVE_SPACE_RATIO is the percentage of the total storage media reserved for GC.

For example: if NVM controller 310 exposes 70% of the media and keeps 30% for GC, the WA may be approximated as [(1/0.3)+0.3]/2~1.812. If NVM controller 310 exposes 80% of the media, WA may be assessed as 2.6.

As known to persons skilled in the art of computer storage, the reserved storage space may not be decreased by software, as it is used internally by the NVM device. However, embodiments may effectively increase the reserved storage space by software if the software limits itself to writes only to a portion of the storage exposed by NVM controller 310. For example, embodiments of GFTL 40 may only enable mapping UBAs to LBA-0 thru LBA-80, when NVM media 30 is configured to receive LBA addresses LBA-0 thru LBA-100.

Reference is now made to FIG. 7, which is a block diagram depicting an example of the WUs that are included within the logical address space 450. This includes WUs that are declared as reserved (e.g. WU N-1 and WU N), according to some embodiments.

A processor (e.g. element 410 of FIG. 4) may be configured to receive (e.g. via a user interface, from the non-transitory memory device and the like) a predefined percentage of WUs, that are to be kept for over-provisioning. Processor 410 may mark at least one WU (e.g. WU N-1 and WU N) as reserved for over-provisioning, according to the predefined percentage. Processor 410 may control the operation of GFTL 40 according to the marking of WUs so:

if the GC pointer points to a non-reserved WU, then perform GC and incrementing the GC pointer to the next WU;

if the GC pointer points to a reserved WU, then incrementing the GC pointer, to point to the next WU, without performing GC on the reserved WU;

if the write pointer points to a non-reserved WU, then mapping UBA of received data objects to at least one LBA within the WU until the WU is full, and then incrementing the write pointer to the next WU; and if the write pointer points to a reserved WU, then incrementing the write pointer to point to the next WU without mapping UBA of received data objects to the occupied WU, to effectively increase the over-provisioning of the NVM media.

As discussed above, when GFTL skips occupied WUs, NVM controller 310 may execute internal GC processes on NVM storage data blocks referred to by the skipped WUs.

According to some embodiments, the mechanism described above for effectively increasing NVM storage media 30 over-provisioning may be further applied to compensate for such internal GC processes, and decrease the WA: as more WUs may be marked as reserved by processor 410, the effective over-provisioning may be increased, and the WA caused by internal GC may be decreased.

According to some embodiments, processor 410 may be configured to dynamically adjust the effective over-provisioning, to accommodate a required level of WA.

For example, processor 410 may be configured to: (a) receive a required level of WA; (b) analyze the data in a metadata table (e.g. element 431 of FIG. 4) of the occupancy module (e.g. element 430 of FIG. 4), to obtain a parameter of occupancy for each WU; (c) mark WUs in which the occupancy is above a predefined occupancy threshold as occupied; (d) determine the actual WA according to at least one of: the number of occupied WUs, the number of reserved WUs, and a distance between the write pointer and the GC pointer; and (e) dynamically adjust the percentage of WUs, that are to be reserved for over-provisioning, so as to effectively adjust NVM media's 30 over-provisioning, and accommodate the required WA, e.g. according to Eq. 3.

Figure 8:
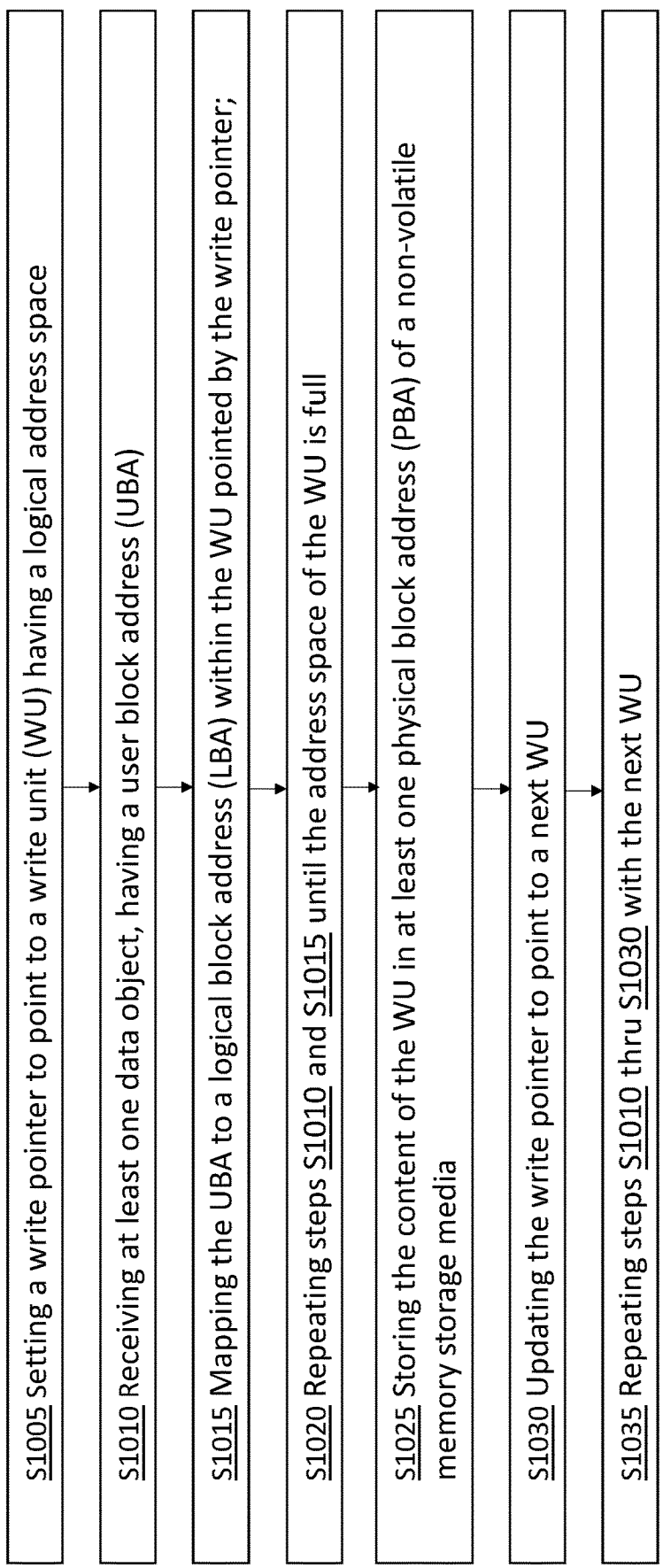
FIG. 8 depicts a flow diagram, elaborating a method of managing non-volatile memory (NVM) computer storage media and optimizing WA of the NVM storage media, according to some embodiments.

Reference is now made to FIG. 8, which depicts a flow diagram, elaborating a method of managing NVM computer storage media and optimizing WA of the NVM storage media, according to some embodiments.

Embodiments of the method may include defining, by a processor (e.g. element 410 of FIG. 4) a logical address space (e.g. element 450 of FIG. 4), including a plurality of logical blocks (e.g. LBA0, LBA1, etc. of FIG. 4). Each logical block may refer to at least one physical data block (e.g. PBA-N, PBA-N+1, etc. of FIG. 5A) of the NVM storage media. The logical address space 450 may be divided into a plurality of WUs (e.g. WH-0, WU-1, etc. of FIG. 4), wherein each WU represents a fixed-sized chunk of contiguous pages of the NVM storage media (e.g. elements 310-a1, 310-a2, etc. of FIGS. 3A and 3B).

In step S1005, embodiments may include setting, by processor 410, a write pointer (e.g. element 41 of FIG. 4), to point to a WU (e.g. WU-0), having a logical address space (e.g. including LBA 0 and LBA 1).

In step S1010, embodiments may include receiving (e.g. from an application 110 executed on a host computer 10), by processor 410, at least one data object, having a user block address (e.g. UBA 0).

In step S1015, embodiments may include mapping, by processor 410, the UBA (e.g. UBA 0) to an LBA (e.g. LBA 0) within the WU (e.g. WU-0) pointed by the write pointer. In some embodiments, mapping of a UBA into an LBA may include writing the content of the UBA into the address space of the LBA and updating a translation table (e.g. element 421 of FIG. 4 in translation layer 420 of FIG. 4), to translate and/or associate the UBA with the LBA.

In step S1020, previous steps S1010 (e.g. receiving data objects) and S1015 (e.g. mapping of UBAs to LBAs) may be repeated until the address space of the WU is full, (e.g. until there is no vacant space in the WU to store an additional data object received from application 110).

In step S1025, embodiments may include storing, by processor 410, the content of the WU (e.g. the at least one data object stored therein) in at least one PBA. For example, as depicted in FIG. 5A, a plurality of data object having a respective plurality of user-block address (e.g. UBA-X, UBA-X+1) may have been mapped into a plurality of LBAs (e.g. LBA0, LBA1) of a WU (e.g. WU-0). When the WU is full, its content may be stored in at least one physical block address (e.g. PBA-N, PBA-N+1), that is associated with the LBAs (e.g. LBA0, LBA1).

In step S1030, embodiments may include updating, by the processor, the write pointer to point to a next WU (e.g. WU-1 of FIG. 5A). For example, the write pointer may be a cyclic pointer, and updating the write pointer may include incrementing the write pointer value sequentially, to point to a next WU, from the first WU of the allocated logical address space to the last WU of the allocated logical address space and wrap around back to the first WU of the allocated logical address space.

In step S1035, embodiments may include repeating steps S1010 thru S1030 with the next WU, e.g. according the incrementation of the WU write pointer.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of managing non-volatile memory (NVM) computer storage media comprising at least one NVM storage device, by at least one processor, wherein the method comprises:
   a. setting a cyclic write pointer to point to a write unit (WU) having a logical address space;
   b. receiving at least one data object, having a user block address (UBA);
   c. mapping the UBA to a logical block address (LBA) within the WU pointed by the write pointer;
   d. repeating steps b and c until the address space of the WU is full;
   e. storing the content of the WU in at least one physical block address (PBA) of the NVM media;
   f. updating the write pointer to point to a next WU; and
   g. repeating steps b thru f with the next WU,
   and wherein the method further comprises:
      receiving at least one value of at least one parameter, selected from a list consisting of: size of data objects, frequency of data write requests, size of WUs and required write amplification (WA) value;
      setting a cyclic garbage collection (GC) pointer to point to a WU having a logical address space, located ahead of the WU pointed by the write pointer;
      performing GC on the WU pointed by the GC pointer; and
      incrementing the cyclic GC pointer to point to a next WU according to the value of the cyclic write pointer and according to the at least one received parameter value.

2. The method of claim 1, wherein mapping the UBA to an LBA further comprises:
   updating the mapping between the UBA and the respective LBA in a metadata table; and
   updating a status of validity of the LBA to one of 'valid' and 'invalid' in the metadata table.

3. The method of claim 2, wherein setting a write pointer to point to a WU having a logical address space comprises:
   a. allocating a logical address space comprising a plurality of logical blocks, wherein each logical block refers to a physical data block of the NVM storage media; and
   b. dividing the allocated logical address space into a plurality of WUs, wherein each WU has a fixed-sized portion of the allocated logical address space, and wherein each WU represents a fixed-sized portion of a plurality of data-pages on the NVM storage media.

4. The method of claim 3, wherein updating the write pointer comprises incrementing the write pointer value sequentially, to point to a next WU, from the first WU of the allocated logical address space to the last WU of the allocated logical address space and wrap around back to the first WU of the allocated logical address space.

5. The method of claim 1, further comprising:
analyzing the data in the metadata table, to obtain a parameter of occupancy for each WU;
marking WUs in which the occupancy is above a predefined occupancy threshold as occupied;
if the GC pointer points to a non-occupied WU, then performing GC and incrementing the GC pointer to the next WU;
if the GC pointer points to an occupied WU, then incrementing the GC pointer without performing GC on the occupied WU;
if the write pointer points to a non-occupied WU, then mapping UBA of received data objects to at least one LBA within the WU until the WU is full, and then incrementing the write pointer to the next WU; and
if the write pointer points to an occupied WU, then incrementing the write pointer to the next WU, without mapping UBA of received data objects to the occupied WU.

6. The method of claim 1, wherein updating the GC pointer comprises incrementing the GC pointer value sequentially, to point to a next WU, from the first WU of the allocated logical address space to the last WU of the allocated logical address space and wrap around back to the first WU of the allocated logical address space.

7. The method of claim 1, wherein performing garbage collection on the WU pointed by the cyclic GC pointer comprises:
reading valid content of at least one page in the WU pointed by the GC pointer;
marking the at least one page in the WU pointed by the GC pointer as invalid;
writing the content into at least one page in the WU pointed by the write pointer; and
marking the at least one page in the WU pointed by the write pointer as valid.

8. The method of claim 1, further comprising:
receiving a percentage of WUs, that are to be kept for over-provisioning;
marking at least one WU as reserved for over-provisioning, according to the predefined percentage;
if the GC pointer points to a non-reserved WU, then performing GC and incrementing the GC pointer to the next WU;
if the GC pointer points to a reserved WU, then incrementing the GC pointer, to point to the next WU without performing GC on the reserved WU;
if the write pointer points to a non-reserved WU, then mapping UBA of received data objects to at least one LBA within the WU until the WU is full, and then incrementing the write pointer to the next WU; and
if the write pointer points to a reserved WU, then incrementing the write pointer to point to the next WU without mapping UBA of received data objects to the occupied WU, to increase the over-provisioning of the NVM media.

9. The method of claim 8, further comprising:
updating the mapping between the UBA and the respective LBA in a metadata table;
updating a status of validity of the LBA to one of 'valid' and 'invalid' in the metadata table;
receiving a required level of WA;
analyzing the data in the metadata table, to obtain a parameter of occupancy for each WU;
marking, by the processor, WUs in which the occupancy is above a predefined occupancy threshold as occupied;
determining the actual WA according to at least one of: the number of occupied WUs, the number of reserved WUs, and a distance between the write pointer and the GC pointer; and
dynamically adjusting the percentage of WUs, that are to be reserved for over-provisioning, to adjust the over-provisioning of the NVM media, and to accommodate the required level of WA.

10. A system for managing NVM computer storage media comprising at least one NVM storage device, the system comprising: a non-transitory computer memory device upon which modules of computer instruction code are stored; and a processor associated with the non-transitory computer memory device and configured to execute the modules of computer instruction code, whereupon execution of the computer instruction code, the processor is configured to:
a. set a cyclic write pointer to point to a WU having a logical address space;
b. receive at least one data object, having UBA;
c. map the UBA to a LBA within the WU pointed by the write pointer;
d. repeat steps b and c until the address space of the WU is full;
e. store the content of the at least one data object WU in at least one PBA of the NVM media;
f. update the write pointer to point to a next WU; and
g. repeat steps b thru f with the next WU,
and wherein the processor is further configured to:
receive at least one value of at least one parameter, selected from a list consisting of: size of data objects, frequency of data write requests, size of WUs and required write amplification (WA) value;
set a cyclic GC pointer to point to a WU having a logical address space, located ahead of the WU pointed by the write pointer;
perform GC on the WU pointed by the GC pointer; and
increment the cyclic GC pointer to point to a next WU according to the value of the cyclic write pointer and according to the at least one received parameter value.

11. The system of claim 10, wherein the processor is further configured to:
update the mapping between the UBA and the respective LBA in a metadata table; and
update a status of validity of the LBA to one of 'valid' and 'invalid' in the metadata table.

12. The system of claim 11, wherein the processor is further configured to:
allocate a logical address space comprising a plurality of logical blocks, wherein each logical block refers to a physical data block of the NVM storage media; and
divide the allocated logical address space into a plurality of WUs, wherein each WU has a fixed-sized portion of the allocated logical address space, and wherein each WU represents a fixed-sized portion of a plurality of data-pages on the NVM storage media.

13. The system of claim 12, wherein the processor is further configured to update the write pointer by incrementing the write pointer value sequentially, to point to a next WU, from the first WU of the allocated logical address space to the last WU of the allocated logical address space and wrap around back to the first WU of the allocated logical address space.

14. The system of claim 11, wherein the processor is further configured to:
- analyze the data in the metadata table, to obtain a parameter of occupancy for each WU;
- mark WUs in which the occupancy is above a predefined occupancy threshold as occupied;
- if the GC pointer points to a non-occupied WU, then perform GC and increment the GC pointer to the next WU;
- if the GC pointer points to an occupied WU, then increment the GC pointer without performing GC on the occupied WU;
- if the write pointer points to a non-occupied WU, then map a UBA of at least one received data object to at least one LBA within the WU until the WU is full, and then increment the write pointer to the next WU; and
- if the write pointer points to an occupied WU, then increment the write pointer to the next WU, without mapping the UBA of received data objects to the occupied WU.

15. The system of claim 10, wherein the processor is further configured to update the GC pointer by incrementing the GC pointer value sequentially, to point to a next WU, from the first WU of the allocated logical address space to the last WU of the allocated logical address space and wrap around back to the first WU of the allocated logical address space.

16. The system of claim 10, wherein the processor is further configured to perform garbage collection on the WU pointed by the cyclic GC by:
- reading valid content of at least one page in the WU pointed by the GC pointer;
- marking the at least one page in the WU pointed by the GC pointer as invalid;
- writing the content into at least one page in the WU pointed by the write pointer; and
- marking the at least one page in the WU pointed by the write pointer as valid.

17. The system of claim 10, wherein the processor is further configured to:
- receive a percentage of WUs, that are to be kept for over-provisioning;
- mark at least one WU as reserved for over-provisioning, according to the predefined percentage;
- if the GC pointer points to a non-reserved WU, then perform GC and increment the GC pointer to the next WU;
- if the GC pointer points to a reserved WU, then incrementing the GC pointer, to point to the next WU without performing GC on the reserved WU;
- if the write pointer points to a non-reserved WU, then map UBA of received data objects to at least one LBA within the WU until the WU is full, and then increment the write pointer to the next WU; and
- if the write pointer points to a reserved WU, then increment the write pointer to point to the next WU without mapping UBA of received data objects to the occupied WU, to increase the over-provisioning of the NVM media.

18. The system of claim 17, wherein the processor is further configured to:
- update the mapping between the UBA and the respective LBA in a metadata table;
- update a status of validity of the LBA to one of 'valid' and 'invalid' in the metadata table;
- receive a required level of WA;
- analyze the data in the metadata table, to obtain a parameter of occupancy for each WU;
- mark, by the processor, WUs in which the occupancy is above a predefined occupancy threshold as occupied;
- determine the actual WA according to at least one of: the number of occupied WUs, the number of reserved WUs, and a distance between the write pointer and the GC pointer; and
- dynamically adjust the percentage of WUs, that are to be reserved for over-provisioning, to adjust the over-provisioning of the NVM media, and to accommodate the required level of WA.

* * * * *